(12) United States Patent
Manolakos et al.

(10) Patent No.: US 12,181,592 B2
(45) Date of Patent: Dec. 31, 2024

(54) MULTI-PORT-MEASUREMENT FEEDBACK

(71) Applicant: QUALCOMM Incorporated, San Diego, CA (US)

(72) Inventors: Alexandros Manolakos, Escondido, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/796,186

(22) PCT Filed: Jan. 15, 2021

(86) PCT No.: PCT/US2021/013590
§ 371 (c)(1),
(2) Date: Jul. 28, 2022

(87) PCT Pub. No.: WO2021/167722
PCT Pub. Date: Aug. 26, 2021

(65) Prior Publication Data
US 2023/0059302 A1    Feb. 23, 2023

(30) Foreign Application Priority Data

Feb. 18, 2020   (GR) .............................. 20200100082

(51) Int. Cl.
*G01S 5/00* (2006.01)
*G01S 5/02* (2010.01)
(Continued)

(52) U.S. Cl.
CPC .......... *G01S 5/0036* (2013.01); *G01S 5/0218* (2020.05); *G01S 5/0236* (2013.01); *H04B 7/063* (2013.01);
(Continued)

(58) Field of Classification Search
CPC .... G01S 5/0036; G01S 5/0218; G01S 5/0236; G01S 2205/007; G01S 1/08; G01S 5/02;
(Continued)

(56) References Cited

U.S. PATENT DOCUMENTS

2002/0161560 A1   10/2002  Abe et al.
2012/0040691 A1*   2/2012  Han ......................... G01S 5/06
                                                    455/456.1

(Continued)

FOREIGN PATENT DOCUMENTS

CN        105850055 A    8/2016
TW        201115173 A    5/2011

OTHER PUBLICATIONS

International Search Report and Written Opinion—PCT/US2021/013590—ISA/EPO—Apr. 22, 2021.
Taiwan Search Report—TW110101820—TIPO—Jul. 27, 2024.

*Primary Examiner* — Kabir A Timory
(74) *Attorney, Agent, or Firm* — QUALCOMM Incorporated

(57) ABSTRACT

A UE includes: a transceiver configured to receive positioning signals from a positioning-signal source; a memory; and a processor communicatively coupled to the transceiver and the memory, the processor configured to: measure a plurality of the positioning signals, from a plurality of ports, spanning a collection of Orthogonal Frequency Division Multiplexed symbols to obtain a plurality of multi-port measurements; determine, based on the plurality of multi-port measurements, that a particular effective beam corresponds to an earliest time of arrival from the positioning-signal source to the UE of a plurality of effective beams associated with the plurality of ports; and send, via the transceiver to a first network entity, a beam indication indicative of the particular effective beam.

28 Claims, 13 Drawing Sheets

(51) Int. Cl.
*H04B 7/06* (2006.01)
*H04W 64/00* (2009.01)
*H04L 5/00* (2006.01)

(52) U.S. Cl.
CPC ........ *H04B 7/0695* (2013.01); *H04W 64/003* (2013.01); *G01S 2205/007* (2013.01); *H04L 5/0007* (2013.01)

(58) Field of Classification Search
CPC ... H04B 7/063; H04B 7/0695; H04W 64/003; H04L 5/0007
See application file for complete search history.

(56) References Cited

U.S. PATENT DOCUMENTS

| | | |
|---|---|---|
| 2017/0366244 A1 | 12/2017 | Lee et al. |
| 2019/0230475 A1 | 7/2019 | Edge et al. |
| 2019/0364535 A1 | 11/2019 | Sadiq et al. |
| 2019/0372652 A1 | 12/2019 | Sadiq et al. |
| 2019/0373595 A1 | 12/2019 | Sadiq et al. |

\* cited by examiner

| Number of ports | Supported CDM |
|---|---|
| 1 | N/A |
| 2 | FD-CDM2 |
| 4 | FD-CDM2 |
| 8 | FD-CDM2, CDM4 (FD2, TD2) |
| 12 | FD-CDM2, CDM4 (FD2, TD2) |
| 16 | FD-CDM2, CDM4 (FD2, TD2) |
| 24 | FD-CDM2, CDM4 (FD2, TD2), CDM8 (FD2, TD4) |
| 32 | FD-CDM2, CDM4 (FD2, TD2), CDM8 (FD2, TD4) |

1100

1110 — k, l | 1120 — w

| k, l | w |
|---|---|
| 0, 0 | $w_1$ |
| 0, 2 | $w_2$ |
| 0, 3 | $w_3$ |
| * | * |
| * | * |
| * | * |
| $QN_1-1, QN_2-2$ | $w_Y$ |
| $QN_1-1, QN_2-1$ | $w_Z$ |

FIG. 11

MULTI-PORT-MEASUREMENT FEEDBACK

CROSS-REFERENCE TO RELATED APPLICATIONS

This application is the National Stage of International Application No. PCT/US2021/013590, filed Jan. 15, 2021, entitled "MULTI-PORT-MEASUREMENT FEEDBACK," which claims the benefit of Greek Patent Application No. 20200100082, filed Feb. 18, 2020, entitled "MULTI-PORT-MEASUREMENT FEEDBACK," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment (UE) includes: a transceiver configured to receive positioning signals from a positioning-signal source; a memory; and a processor communicatively coupled to the transceiver and the memory, the processor being configured to: measure a plurality of the positioning signals, from a plurality of ports, spanning a collection of Orthogonal Frequency Division Multiplexed symbols to obtain a plurality of multi-port measurements; determine, based on the plurality of multi-port measurements, that a particular effective beam corresponds to an earliest time of arrival from the positioning-signal source to the UE of a plurality of effective beams associated with the plurality of ports; and send, via the transceiver to a first network entity, a beam indication indicative of the particular effective beam.

Implementations of such a UE may include one or more of the following features. To determine that the particular effective beam corresponds to the earliest time of arrival of the plurality of effective beams, the processor is configured to choose the particular effective beam from a codebook based on the plurality of multi-port measurements, the codebook comprises a plurality of steering vectors, and the beam indication comprises a beam index indicative of a particular steering vector, of the plurality of steering vectors, that corresponds to the particular effective beam. The processor is configured to: receive at least one codebook configuration value from a second network entity via the transceiver; and calculate the plurality of steering vectors of the codebook based on the at least one codebook configuration value. The processor is configured to: receive an oversampling factor from the second network entity; and calculate the plurality of steering vectors based further on the oversampling factor. The memory stores the plurality of steering vectors.

Also or alternatively, implementations of such a UE may include one or more of the following features. The beam indication is an angle of departure of the particular effective beam from the positioning-signal source. The particular effective beam is a first effective beam, and wherein the processor is further configured to: determine a co-phasing factor for the particular effective beam and a second effective beam, of the plurality of effective beams, the particular effective beam and the second effective beam corresponding to different polarizations; and send, via the transceiver to a second network entity, the co-phasing factor. The processor is configured to send the co-phasing factor such that a single value of the co-phasing factor corresponds to an entire bandwidth associated with the plurality of the positioning signals. The processor is further configured to send, to the second network entity, a quality metric indicating whether the particular effective beam is a line-of-sight beam between the positioning-signal source and the UE.

Also or alternatively, implementations of such a UE may include one or more of the following features. The plurality of the positioning signals comprises a multi-port PRS resource (multi-port positioning reference signal resource), and wherein the processor is configured to: obtain an expected time of arrival of the multi-port PRS resource; and determine the shortest time of arrival at least based on the expected time of arrival of the multi-port PRS resource. To obtain the expected time of arrival of the multi-port PRS resource, the processor is configured to: measure a single-port, fully-staggered PRS resource to obtain a single-port measurement; and use the single-port, fully-staggered PRS resource as a quasi co-located (QCL) reference for the multi-port PRS resource. The processor is configured to use the single-port, fully-staggered PRS resource as the QCL reference with respect to at least one of average delay of the multi-port PRS resource or the expected time of arrival of the multi-port PRS resource. To obtain the expected time of arrival of the multi-port PRS resource, the processor is configured to receive, via the transceiver, an explicit indication of time of arrival.

Also or alternatively, implementations of such a UE may include one or more of the following features. To determine that the particular effective beam of the plurality of effective beams corresponds to the earliest time of arrival from the positioning-signal source to the UE, the processor is configured to: determine an impulse response corresponding to each of the plurality of effective beams; and determine the impulse response with the earliest time of arrival. The processor is configured to measure the plurality of the positioning signals in accordance with a channel state information reference signal resource element pattern for channel state information acquisition. The plurality of the positioning signals are in a single resource. The plurality of the positioning signals comprises a plurality of single-port PRS resources, and wherein the processor is configured to: obtain an expected time of arrival for each of the plurality of single-port PRS resources; and determine the earliest time of arrival based on the expected time of arrival of each of the plurality of single-port PRS resources.

In another embodiment, a UE includes: receiving means for receiving positioning signals from a positioning-signal source; measuring means for measuring a plurality of the positioning signals, from a plurality of ports, spanning a collection of Orthogonal Frequency Division Multiplexed symbols to obtain a plurality of multi-port measurements; determining means for determining, based on the plurality of multi-port measurements, that a particular effective beam corresponds to an earliest time of arrival from the positioning-signal source to the UE of a plurality of effective beams associated with the plurality of ports; and sending means for sending, to a first network entity, a beam indication indicative of the particular effective beam.

Implementations of such a UE may include one or more of the following features. The determining means are for choosing the particular effective beam from a codebook based on the plurality of multi-port measurements to determine that the particular effective beam corresponds to the earliest time of arrival of the plurality of effective beams, the codebook comprises a plurality of steering vectors, and the sending means are for selecting a beam index, as the beam indication, indicative of a particular steering vector, of the plurality of steering vectors, that corresponds to the particular effective beam. The UE includes means for determining an angle of departure of the particular effective beam from the positioning-signal source as the beam indication. The particular effective beam is a first effective beam, the UE includes phase means for determining a co-phasing factor for the particular effective beam and a second effective beam, of the plurality of effective beams, the particular effective beam and the second effective beam corresponding to different polarizations, and the sending means are further for sending, to a second network entity, the co-phasing factor. The sending means are for sending the co-phasing factor such that a single value of the co-phasing factor corresponds to an entire bandwidth associated with the plurality of the positioning signals. The UE includes quality means for determining a quality metric indicative of whether the particular effective beam is a line-of-sight beam between the positioning-signal source and the UE, and the sending means are further for sending the quality metric to the second network entity.

Also or alternatively, implementations of such a UE may include one or more of the following features. The plurality of the positioning signals comprises a multi-port PRS resource (multi-port positioning reference signal resource), the UE includes means for obtaining an expected time of arrival of the multi-port PRS resource, and the determining means are for determining the earliest time of arrival based on the expected time of arrival of the multi-port PRS resource. The means for obtaining the expected time of arrival of the multi-port PRS resource comprise: means for measuring a single-port, fully-staggered PRS resource to obtain a single-port measurement; and using means for using the single-port, fully-staggered PRS resource as a quasi co-located (QCL) reference for the multi-port PRS resource. The using means are for using the single-port, fully-staggered PRS resource as the QCL reference with respect to at least one of average delay of the multi-port PRS resource or the expected time of arrival of the multi-port PRS resource.

Also or alternatively, implementations of such a UE may include one or more of the following features. The determining means are for: determining an impulse response corresponding to each of the plurality of effective beams; and determining the impulse response with the earliest time of arrival.

In another embodiment, a method of providing multi-port-measurement feedback includes: measuring, at a UE from a positioning-signal source, a plurality of positioning signals, from a plurality of ports, spanning a collection of Orthogonal Frequency Division Multiplexed symbols to obtain a plurality of multi-port measurements; determining, based on the plurality of multi-port measurements, that a particular effective beam corresponds to an earliest time of arrival from the positioning-signal source to the UE of a plurality of effective beams associated with the plurality of ports; and sending, to a first network entity from the UE, a beam indication indicative of the particular effective beam.

Implementations of such a method may include one or more of the following features. Determining that the particular effective beam corresponds to the earliest time of arrival of the plurality of effective beams comprises choosing the particular effective beam from a codebook based on the plurality of multi-port measurements, wherein the codebook comprises a plurality of steering vectors, and the beam indication comprises a beam index indicative of a particular steering vector, of the plurality of steering vectors, that corresponds to the particular effective beam. The method includes: receiving, at the UE, at least one codebook configuration value from a second network entity; and calculating, at the UE, the plurality of steering vectors of the codebook based on the at least one codebook configuration value.

Also or alternatively, implementations of such a method may include one or more of the following features. The beam indication is an angle of departure of the particular effective beam from the positioning-signal source. The particular effective beam is a first effective beam, the method including: determining a co-phasing factor for the particular effective beam and a second effective beam, of the plurality of effective beams, the particular effective beam and the second effective beam corresponding to different polarizations; and sending, to a second network entity, the co-phasing factor. Sending the co-phasing factor comprises sending a single value of the co-phasing factor to correspond to an entire bandwidth of the plurality of positioning signals.

Also or alternatively, implementations of such a method may include one or more of the following features. The plurality of positioning signals comprises a multi-port PRS resource (multi-port positioning reference signal resource), the method including: obtaining an expected time of arrival of the multi-port PRS resource; and determining the earliest time of arrival based on the expected time of arrival of the multi-port PRS resource. Obtaining the expected time of arrival of the multi-port PRS resource comprises: measuring a single-port, fully-staggered PRS resource to obtain a single-port measurement; and using the single-port, fully-staggered PRS resource as a quasi co-located (QCL) reference for the multi-port PRS resource. The single-port, fully-staggered PRS resource is used as the QCL reference with respect to at least one of average delay of the multi-port PRS resource or the expected time of arrival of the multi-port PRS resource.

Also or alternatively, implementations of such a method may include one or more of the following features. Determining that the particular effective beam of the plurality of effective beams corresponds to the earliest time of arrival from the positioning-signal source to the UE comprises: determining an impulse response corresponding to each of the plurality of effective beams; and determining the impulse response with the earliest time of arrival. Measuring the plurality of positioning signals is performed in accordance with a channel state information reference signal resource element pattern for channel state information acquisition.

In another embodiment, a non-transitory, processor-readable storage medium includes processor-readable instructions to cause a processor of a UE to: measure, from a positioning-signal source, a plurality of positioning signals, from a plurality of ports, spanning a collection of Orthogonal Frequency Division Multiplexed symbols to obtain a plurality of multi-port measurements; determine, based on the plurality of multi-port measurements, that a particular effective beam corresponds to an earliest time of arrival from the positioning-signal source to the UE of a plurality of effective beams associated with the plurality of ports; and send, to a first network entity from the UE, a beam indication indicative of the particular effective beam.

Implementations of such a storage medium may include one or more of the following features. The instructions to cause the processor to determine that the particular effective beam corresponds to the earliest time of arrival of the plurality of effective beams comprise instructions to cause the processor to choose the particular effective beam from a codebook based on the plurality of multi-port measurements, and the codebook comprises a plurality of steering vectors, and wherein the beam indication comprises a beam index indicative of a particular steering vector, of the plurality of steering vectors, that corresponds to the particular effective beam. The storage medium includes instructions to cause the processor to: receive at least one codebook configuration value from a second network entity; and calculate the plurality of steering vectors of the codebook based on the at least one codebook configuration value.

Also or alternatively, implementations of such a storage medium may include one or more of the following features. The storage medium includes instructions to cause the processor to determine, as the beam indication, an angle of departure of the particular effective beam from the positioning-signal source. The particular effective beam is a first effective beam, and the storage medium includes instructions to cause the processor to: determine a co-phasing factor for the particular effective beam and a second effective beam, of the plurality of effective beams, the particular effective beam and the second effective beam corresponding to different polarizations; and send, to a second network entity, the co-phasing factor. The storage medium includes instructions to cause the processor to send the co-phasing factor such that a single value of the co-phasing factor corresponds to an entire bandwidth of the plurality of positioning signals.

Also or alternatively, implementations of such a storage medium may include one or more of the following features. The plurality of positioning signals comprises a multi-port PRS resource (multi-port positioning reference signal resource), and the storage medium comprises instructions to cause the processor to: obtain an expected time of arrival of the multi-port PRS resource; and determine the earliest time of arrival based on the expected time of arrival of the multi-port PRS resource. The instructions to cause the processor to obtain the expected time of arrival of the multi-port PRS resource comprise instructions to cause the processor to: measure a single-port, fully-staggered PRS resource to obtain a single-port measurement; and use the single-port, fully-staggered PRS resource as a quasi co-located reference for the multi-port PRS resource. The storage medium includes instructions to cause the processor to use the single-port, fully-staggered PRS resource as the QCL reference with respect to at least one of average delay of the multi-port PRS resource or the expected time of arrival of the multi-port PRS resource.

Also or alternatively, implementations of such a storage medium may include one or more of the following features. The instructions to cause the processor to determine that the particular effective beam of the plurality of effective beams corresponds to the earliest time of arrival from the positioning-signal source to the UE comprise instructions to cause the processor to: determine an impulse response corresponding to each of the plurality of effective beams; and determine the impulse response with the earliest time of arrival. The instructions to cause the processor to measure the plurality of positioning signals are comprise instructions to cause the processor to measure the plurality of positioning signals in accordance with a channel state information reference signal resource element pattern for channel state information acquisition.

BRIEF DESCRIPTION OF THE DRAWINGS

FIG. 11 is a table of beam indices and steering matrices.

DETAILED DESCRIPTION

Figure 1:
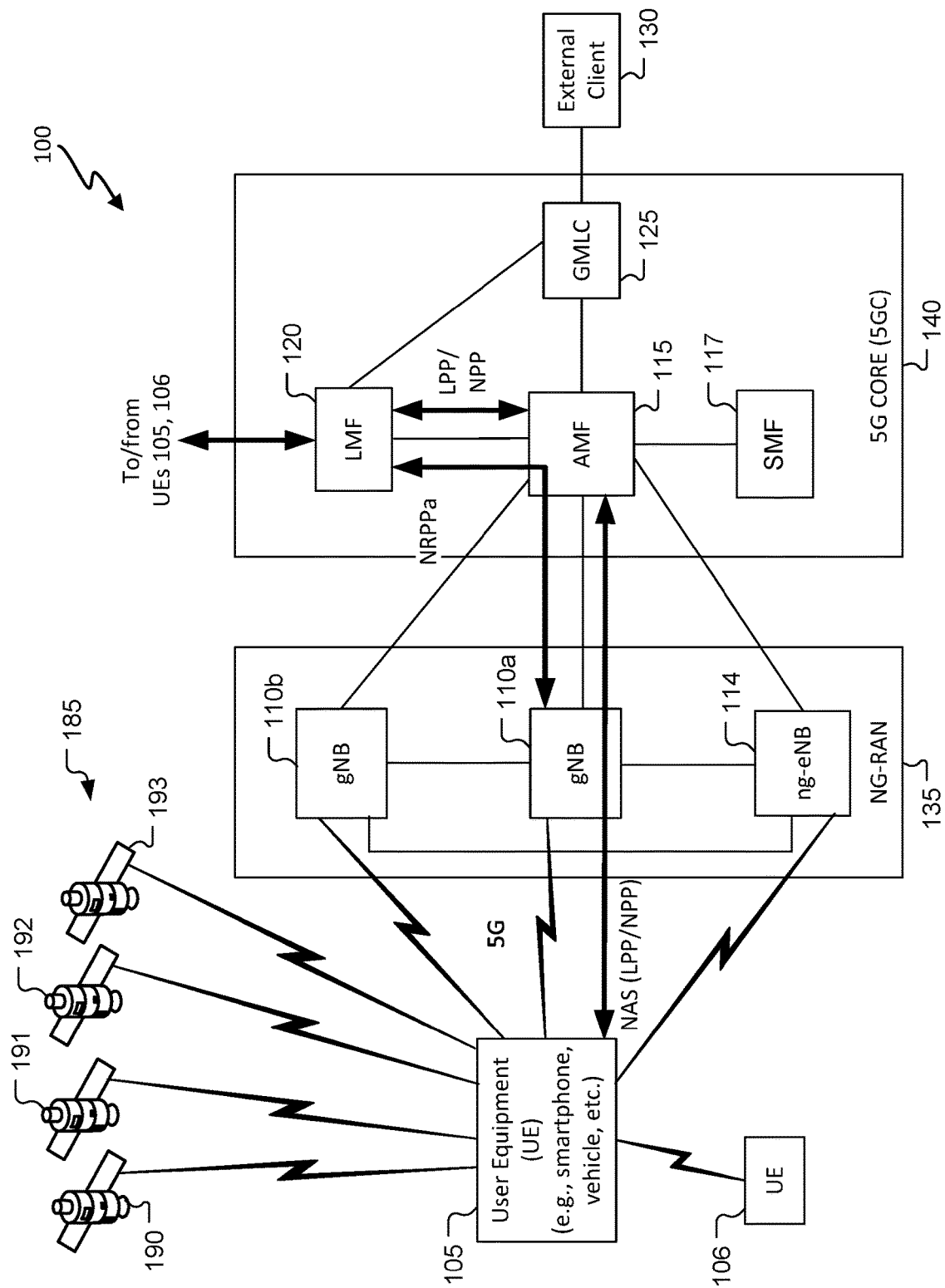
FIG. 1 is a simplified diagram of an example wireless communications system.

Techniques are discussed herein for taking measurement of multi-port positioning signals and providing feedback regarding the measurements (e.g., information derived from the measurements). For example, a user equipment measures multi-port positioning signals to obtain measurements and applies multiple steering vectors to the measurements to determine an earliest-arriving effective beam at the user equipment. The user equipment may determine a co-phasing factor corresponding to a phase difference between differently-polarized effective beams. The user equipment may report information based on the measured multi-port positioning signals. For example, the user equipment may report information from which an angle of departure of the effective beam may be determined, or that includes the angle of departure itself. The information may include an index of a matrix of steering vectors and the co-phasing factor. These are examples, and other examples may be implemented.

Items and/or techniques described herein may provide one or more of the following capabilities, as well as other capabilities not mentioned. An angle of departure of positioning signals may be determined from measurements of the positioning signals. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
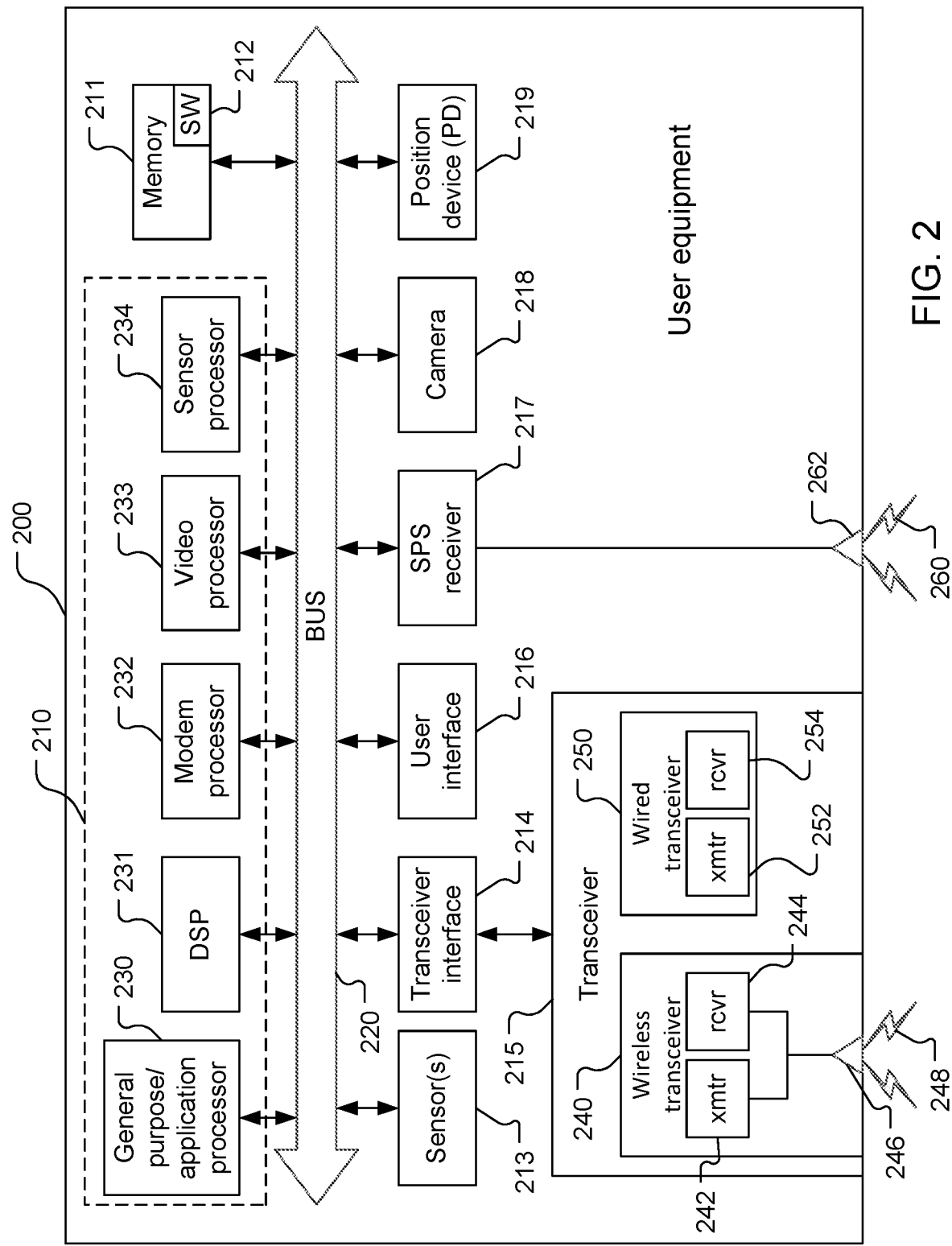
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function.

The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
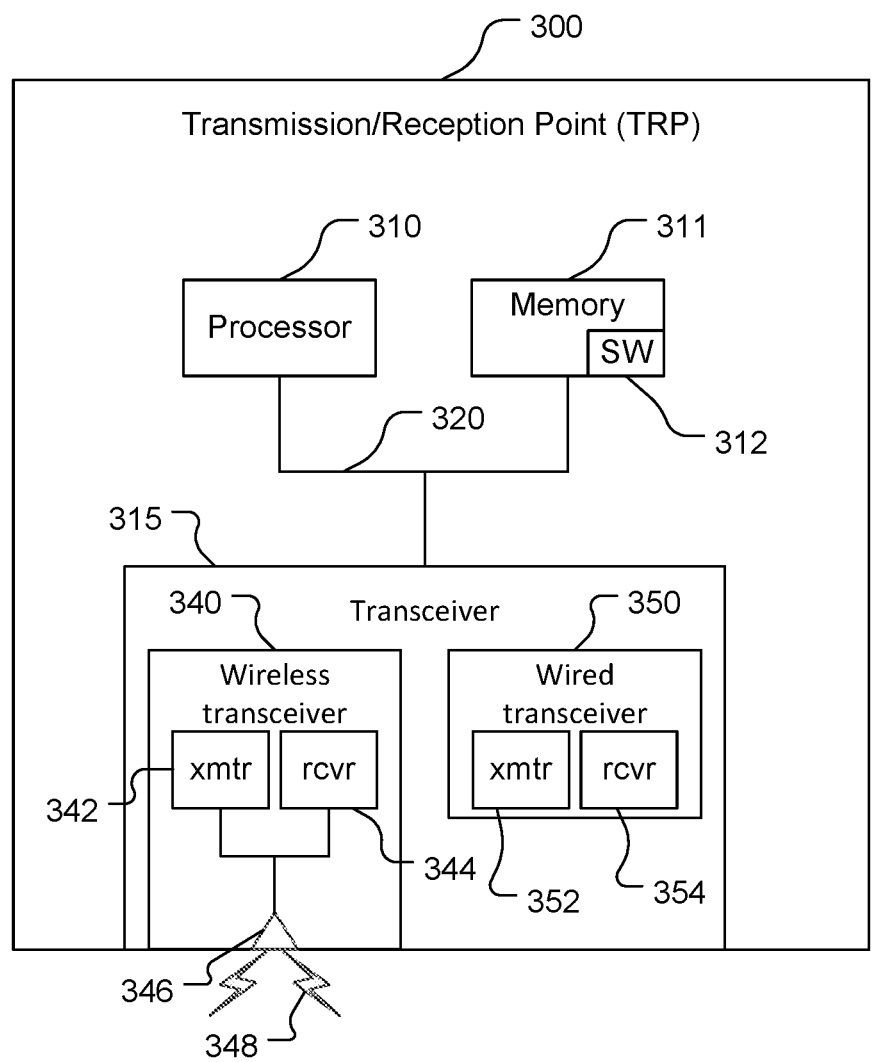
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
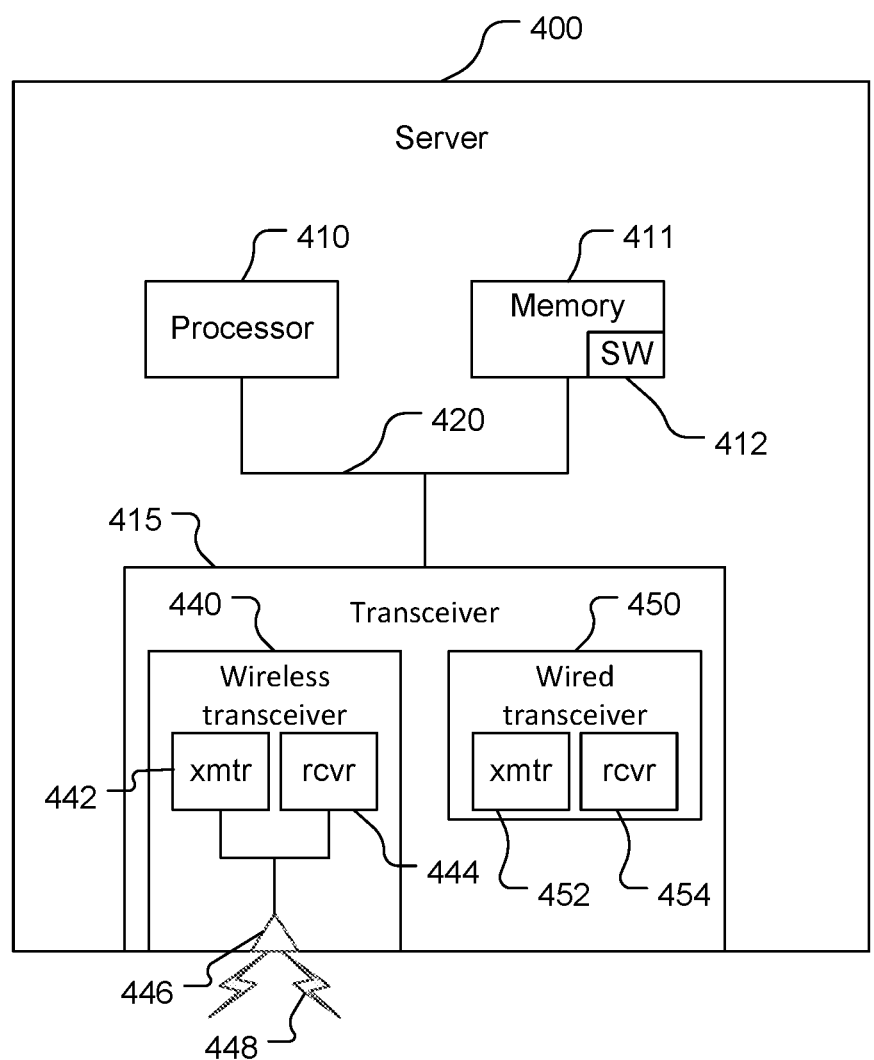
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/ integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Downlink PRS

Figure 5:
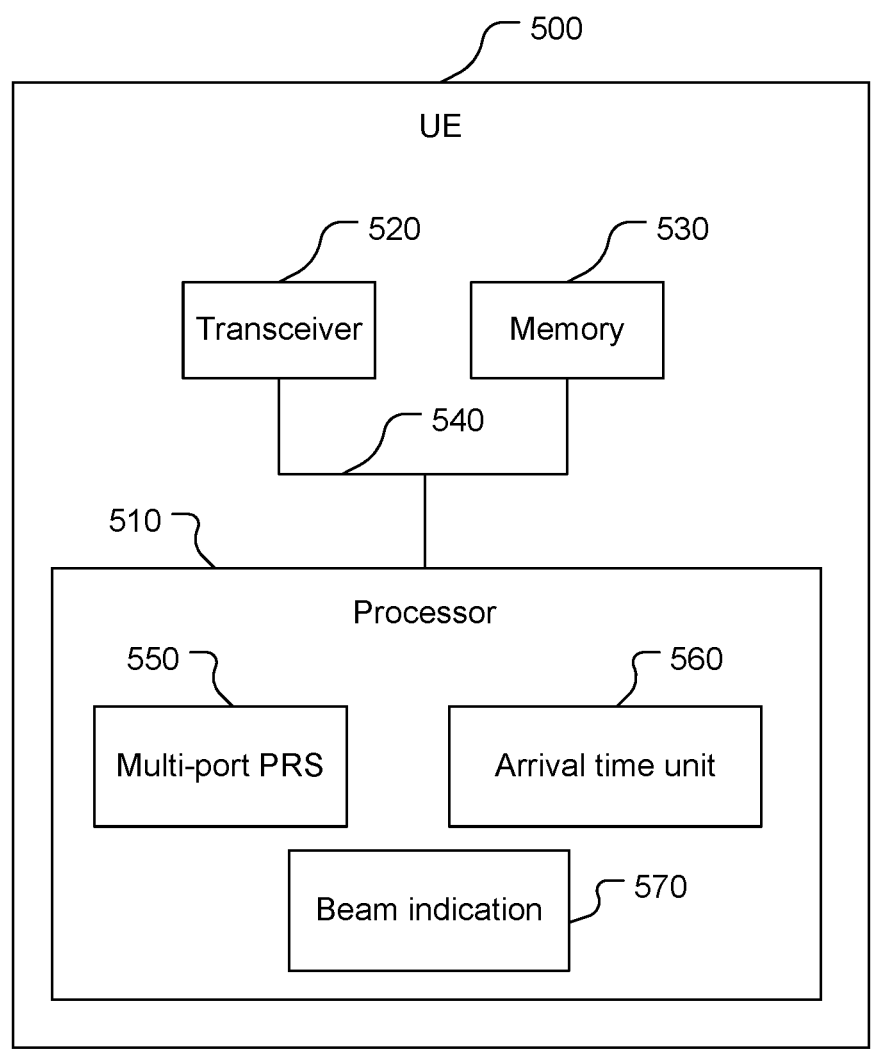
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a multi-port PRS unit 550, a arrival time unit 560, and a beam indication unit 570. The multi-port PRS unit 560 is configured to measure multi-port PRS. The arrival time unit 560 is configured to determine an effective earliest time of arrival beam from the TRP 300 that sent the multi-port PRS to the UE 500, and thus a shortest time of travel beam. The beam indication unit is configured to send a beam indication indicative of the earliest arrival time beam and thus the effective shortest time of travel beam. The units 550, 560, 570 are discussed further below, and the description may refer to the processor 510 generally, or the UE 500 generally, as performing any of the functions of the units 550, 560, 570.

Figure 6A:
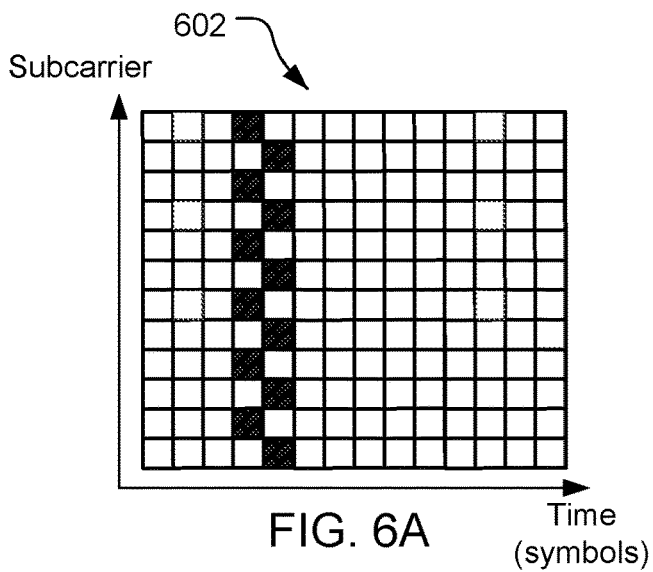
FIG. 6A is an example of a simplified comb-2, 2-symbol transmission schedule.
Figure 6B:
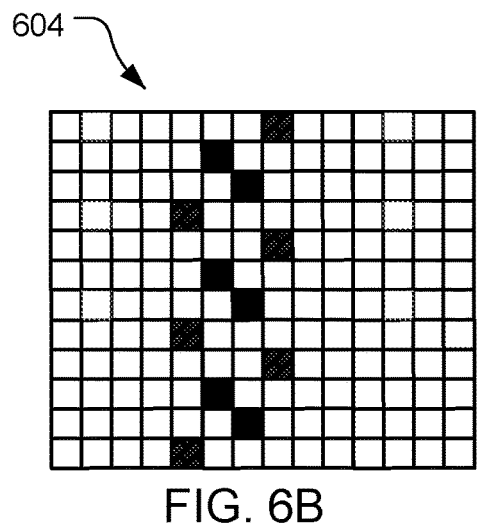
FIG. 6B is an example of a simplified comb-4, 4-symbol transmission schedule.
Figure 6C:
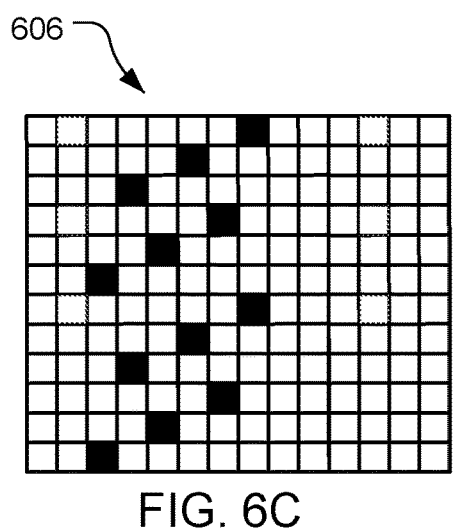
FIG. 6C is an example of a simplified comb-6, 6-symbol transmission schedule.
Figure 6D:
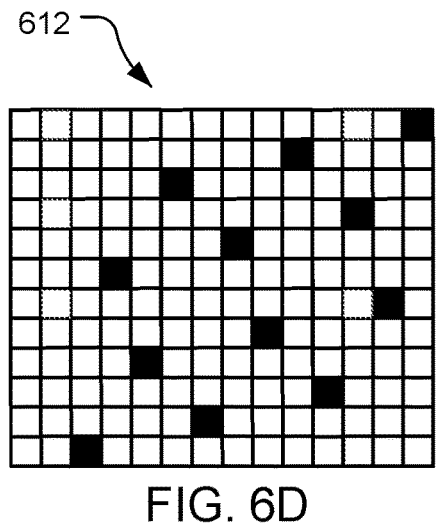
FIG. 6D is an example of a simplified comb-12, 12-symbol transmission schedule.
Figure 6E:
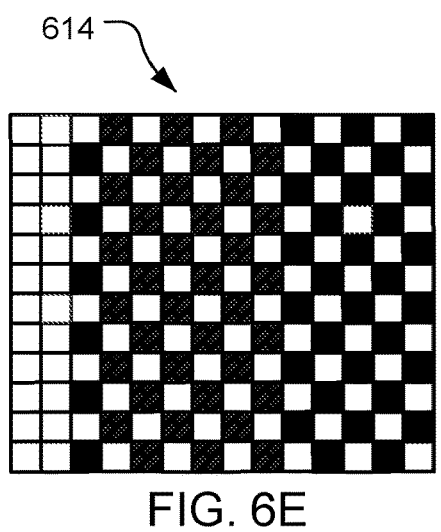
FIG. 6E is an example of a simplified comb-2, 12-symbol transmission schedule.
Figure 6F:
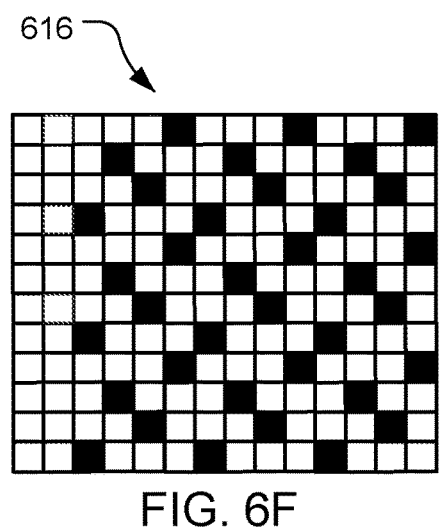
FIG. 6F is an example of a simplified comb-4, 12-symbol transmission schedule.

PRS resources may be sent by TRPs 300 using a variety of transmission schedules (also called transmission patterns). Referring also to FIGS. 6A-6F, examples of transmission schedules of resources of various combinations of comb types and quantities of symbols are shown. Vertical axes of the schedules are subcarriers and horizontal axes are time in symbols, although the axes are shown and labeled only in FIG. 6A. FIG. 6A shows a transmission schedule 602 for a comb-2, 2-symbol resource with a symbol offset of three symbols in a slot containing 14 symbols each with 12 subcarriers. In the transmission schedules shown, columns represent different symbols, rows represent different subcarriers, and darkened boxes represent sounded resource elements (symbol-subcarrier combinations) for a TRP. Unsounded resource elements could be sounded by one or more other TRPs and/or for one or more other signals (in this case, other than PRS). FIG. 6B shows a transmission schedule 604 for a comb-4, 4-symbol resource. FIG. 6C shows a transmission schedule 606 for a comb-6, 6-symbol resource. FIG. 6D shows a transmission schedule 612 for a comb-12, 12-symbol resource. FIG. 6E shows a transmission schedule 614 for a comb-2, 12-symbol resource. FIG. 6F shows a transmission schedule 616 for a comb-4, 12-symbol resource. Each of the transmission patterns in FIGS. 6A-6F has at least one sounded RE in each of the subcarriers and is thus a fully-staggered transmission pattern. If each pattern corresponds to a PRS resource, then each PRS resource is a fully-staggered resource.

Figures 7, 8:
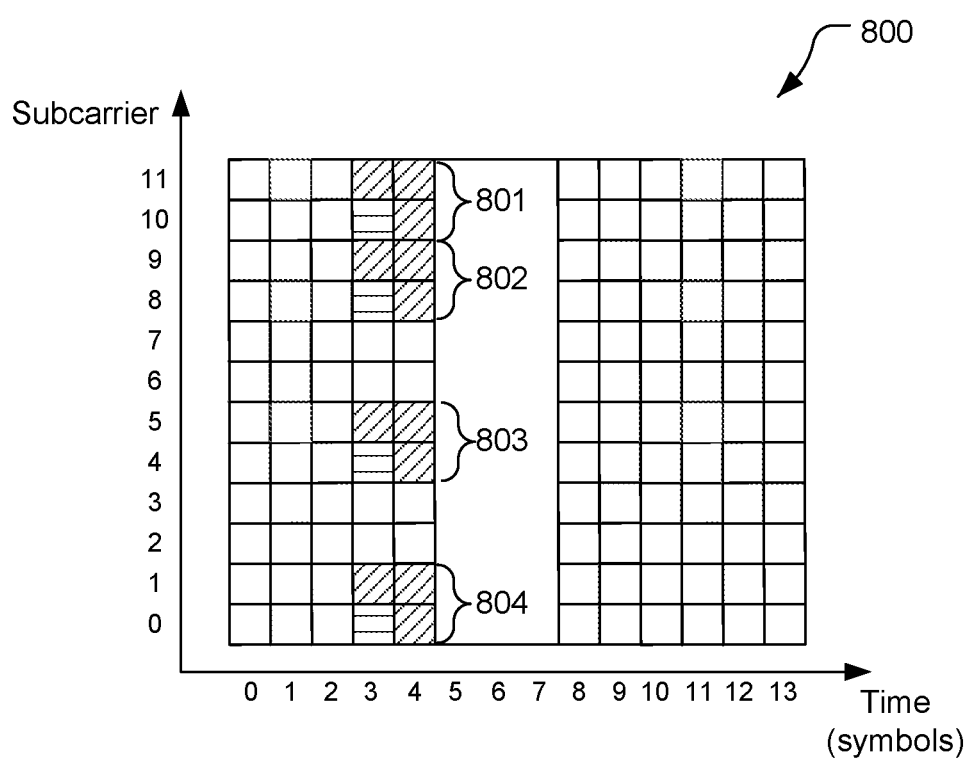
FIG. 7 is a table of channel state information reference signal patterns.
FIG. 8 is a resource element pattern for 16 ports with four groups each of a CDM4 configuration for a channel state information reference signal.

Reference signals may be transmitted in accordance a variety of resource element patterns. For example, numerous RE patterns have been defined for CSI-RS (Channel State Information-Reference Signal) signaling. Referring to FIG. 7, a table 700 shows presently-supported RE patterns for CSI-RS. Resource elements that are adjacent in the frequency domain and/or the time domain may be defined as a group. Each RE in a group comprises a Code Division Multiplexed (CDM) combination of signals from multiple ports.

Figure 9:
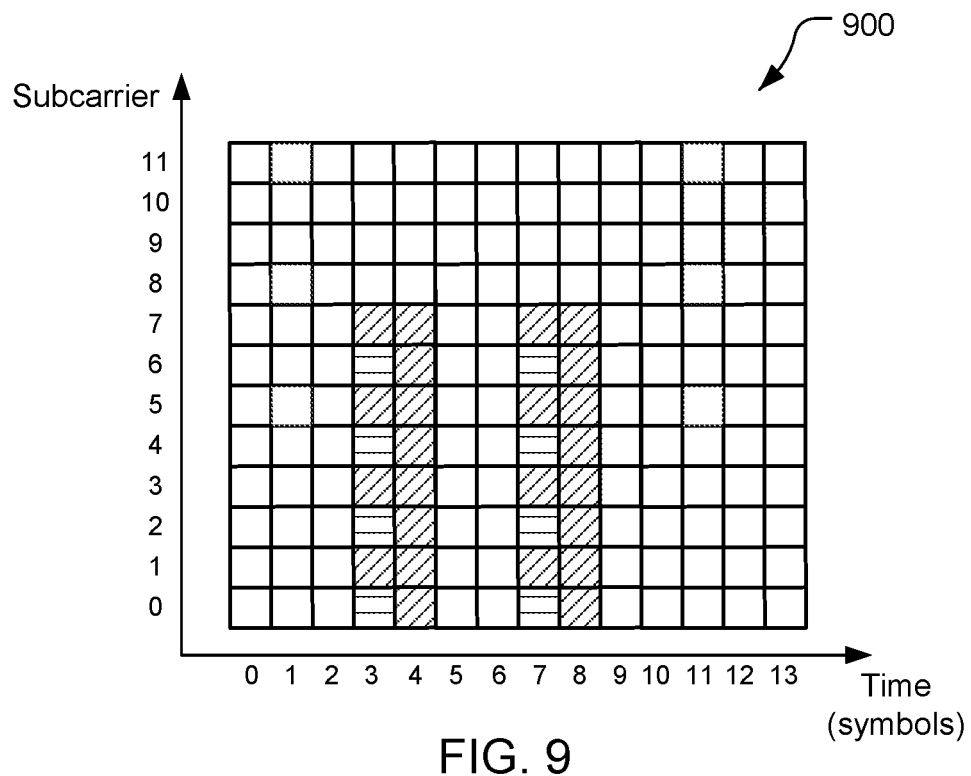
FIG. 9 is a resource element pattern for 32 ports with eight groups each of a CDM4 configuration for a channel state information reference signal.
Figure 10:
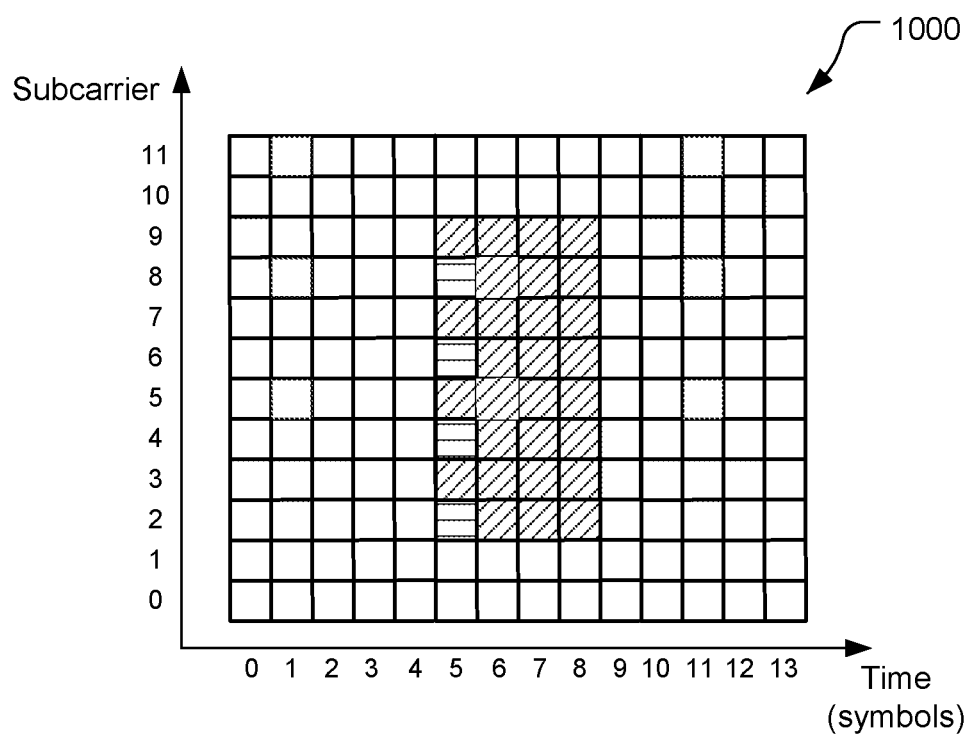
FIG. 10 is a resource element pattern for 32 ports with four groups each of a CDM8 configuration for a channel state information reference signal.

Referring also to FIGS. 8-10, examples of RE groups for supporting 16-port and 32-port configurations, respectively, are shown. A pattern 800 of REs for 16 ports includes four CDM groups 801, 802, 803, 804 each of a CDM4 (FD2, TD2) configuration (with some lines demarcating subcarriers and symbols omitted to facilitate clear labeling of the groups). A pattern 900 of REs for 32 ports includes eight groups of CDM4 (FD2, TD2) configuration, and a pattern 1000 of REs for 32 ports includes four groups of CDM8 (FD2, TD4) configuration. In the patterns 800, 900, 1000, REs shown with horizontal cross-hatching are anchor REs for their respective CDM groups, indicating the starting of a CDM group. Different groups of the REs may be designated for ports of different polarizations of a dual-polarized antenna.

Codebook-Based Feedback

Codebook-based precoding is a type of vector quantization of a channel experienced by a UE. The precoder codebook is a set of precoder matrices each of which comprises a set of precoding weights including phase values that may be applied to respective antenna elements for beam steering of a beam produced by the antenna. Consequently, a precoder matrix may be called a steering matrix. The weights of the precoder codebook may be designed to take into account typical cellular propagation channels and antenna deployments. Codebooks are typically designed based on one-dimensional or two-dimensional Discrete Fourier Transform (1D/2D-DFT) vectors and thus implicitly assume that a uniform linear or uniform planar array (UPA) is used, e.g., at a TRP, e.g., a gNB.

As numerous two-dimensional antenna array dimensions may be used, codebooks are typically configurable and scalable. The antenna port (element) layout of an antenna panel in vertical (number of rows) and horizontal (number of columns) dimensions (labeled $N_1$ and $N_2$, respectively) may be configured as part of a codebook configuration. For a multi-panel codebook, a number of panels, $N_g$, is also configured. If a dual-polarized antenna is used (which may be assumed), then a total number of ports of the codebook for the antenna is given by $P=2N_gN_1N_2$, where P is the number of ports and $N_g=1$ for a single-panel case. Up to 32 ports are supported for NR codebooks at present, although the description herein is not limited to 32 ports. Presently, in NR, antenna port layouts that are supported comprise row and column combinations of: 1×2, 1×4, 1×6, 1×8, 1×12, 1×16, 2×2, 2×3, 2×4, 2×6, 2×8, 3×4, 4×4, although the description herein is not limited to these configurations. The $N_1$, $N_2$ configuration may be configured per multi-port PRS resource, or per PRS resource set, or per frequency layer, or associated with one or more TRPs 300 (e.g., associated with one or more TRP IDs).

A codebook may be used that comprises a constant modulus DFT for a dual-polarized, two-dimensional UPA. The codebook may comprise a combination of two linear precoder vectors. A DFT precoder where the precoder vector w used to precode a single-layer transmission using a single-polarized uniform linear array (ULA) with N antennas can be defined as $$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix} \quad (1)$$

where k=0, 1, 2, . . . , Q(N−1) is a precoder index and Q is an oversampling factor that may be configured by a network entity (e.g., the TRP 300 or the server 400). For a two-dimensional UPA, a corresponding precoder matrix can be produced by taking the Kronecker product of two precoder vectors according to $$w_{2D}(k,l) = w_{1D}(k) \otimes w_{1D}(l) \quad (2)$$

where k is the precoder index in one dimension and l is the precoder index in the other dimension (k=0, 1, 2, . . . , Q(N₁−1), l=0, 1, 2, . . . , Q(N₂−1)). This can be extended for a dual-polarized UPA according to $$W_{2D,DP}(k, l, \phi) = \begin{bmatrix} 1 \\ e^{j\phi} \end{bmatrix} \otimes w_{2D}(k, l) \quad (3)$$
$$= \begin{bmatrix} w_{2D}(k, l) \\ e^{j\phi} w_{2D}(k, l) \end{bmatrix}$$
$$= \begin{bmatrix} w_{2D}(k, l) & 0 \\ 0 & w_{2D}(k, l) \end{bmatrix} \begin{bmatrix} 1 \\ e^{j\phi} \end{bmatrix}$$

where $e^{j\phi}$ is a co-phasing factor between the two dual polarizations (e.g., orthogonal polarizations). A fixed quantity of values of $\phi$ may be evaluated, e.g., selected from a QPSK alphabet where $$\phi \in \left\{ 0, \frac{\pi}{2}, \pi, \frac{3\pi}{2} \right\}.$$

The co-phasing factor is a phase difference between signals transmitted by the different polarizations of the antenna elements. A co-phasing factor between polarizations may vary over frequency while a beam direction corresponding to one of the precoder matrices, $w_{2D}(k, l)$, yielding a strongest beam (e.g., for codebook-based CSI feedback) or line-of-sight (LOS) beam will typically remain the same with different frequencies. The precoder matrix may be split into a matrix or beam factor indicative of the beam direction, which may be selected on a wideband level, and a phase factor comprising the polarization co-phasing, which may be selected on a sub-band level.

Referring again to FIG. 5, with further reference to FIGS. 1-4 and 11, the UE 500 may store, e.g., in the memory 530, multiple codebooks and/or may be configured to calculate a codebook based on receiving values of codebook configuration values of N₁, N₂, Q, and $\phi$ (i.e., the alphabet of $\phi$ values). The values of Q, N₂, and/or $\phi$ may be omitted as appropriate (e.g., a one-dimensional antenna array, no oversampling, no dual polarization, respectively). For example, the UE 500 may calculate and store a codebook 1100 that includes beam indices 1110 and corresponding steering matrices 1120 (that each include a set of steering vectors). Given values for N₁, N₂, and Q, the UE 500 can calculate values for steering matrices w₁-w_Z using equations (1) and (2) where Z=(QN₁*QN₂)−1, and where in FIG. 11, Y=(QN₁*QN₂)−2. The UE 500 may further calculate the value of each steering matrix w multiplied by $e^{j\phi}$ (per equation (3)) for each value of $\phi$ in an alphabet of $\phi$ values (e.g., nπ/2 where n=0, 1, 2, 3, or nπ/8 where n=0, 1, . . . , 7, although other alphabets of $\phi$ values may be used).

The UE 500 (e.g., the processor 510, possibly in combination with the memory 530, and the transceiver 520) is configured to measure multi-port PRS and determine information regarding at least one effective beam of the multi-port PRS. The determined information may be useful in determining a position of the UE 500. For example, the determined information may be used to determine an AoD of the multi-port PRS that is line-of-sight from a source of the multi-port PRS, e.g., the TRP 300, to the UE 500, or may be an indication of the AoD itself, or may provide an indication that a particular beam is most likely to be a line-of-sight beam from a source of the multi-port PRS to the UE 500.

Figure 12:
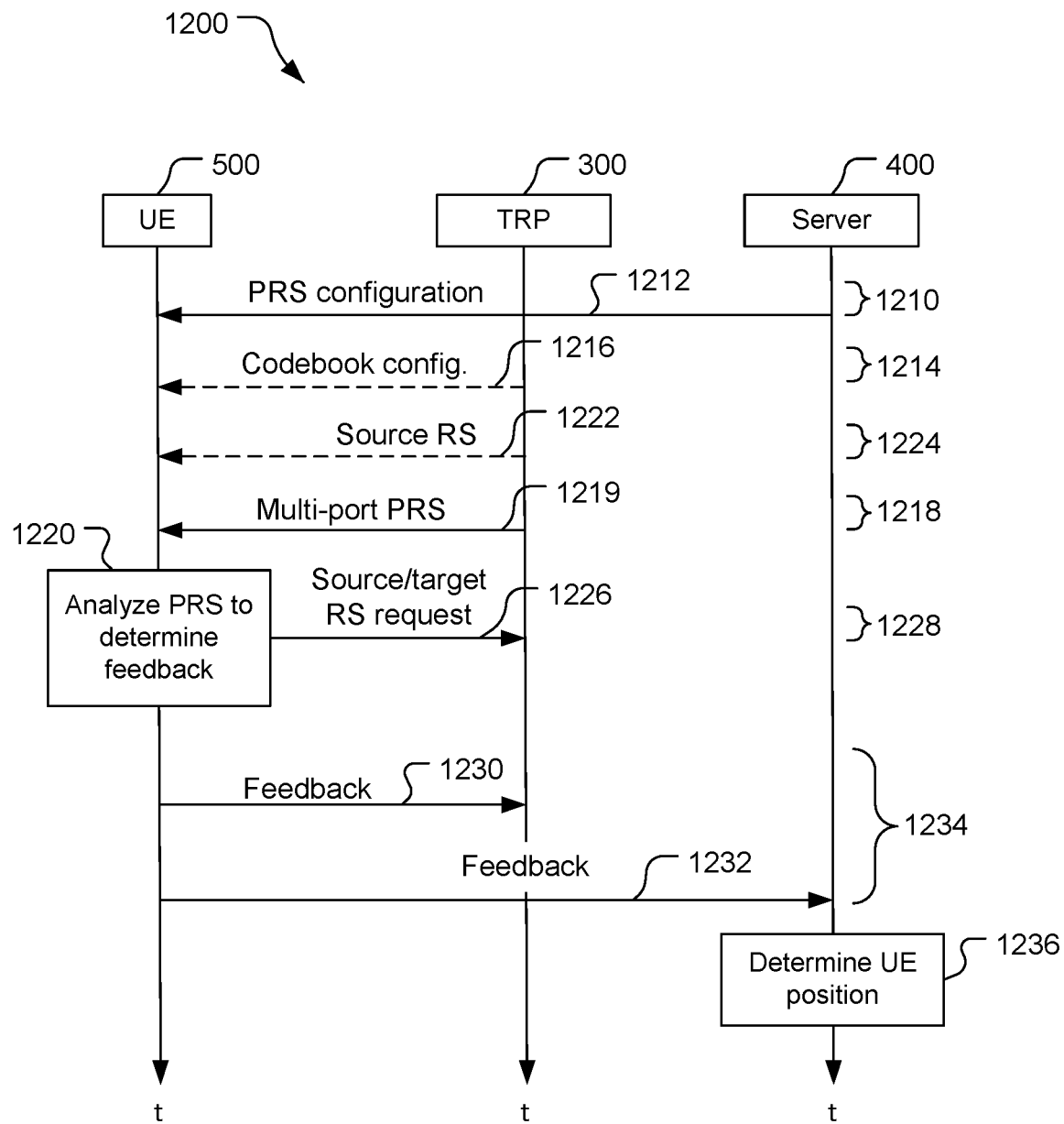
FIG. 12 is a signaling and process flow of measuring multi-port positioning reference signal and providing feedback.

Referring also to FIG. 12, a signaling and process flow 1200 of measuring multi-port PRS and providing feedback includes the stages shown. At stage 1210, the server 400 (e.g., an LMF) provides a PRS configuration 1212 to the UE 500, and possibly to the TRP 300. The PRS configuration 1212 provides scheduling information for the PRS, provides an indication to the UE 500 that the PRS will be a multi-port PRS, and provides codebook configuration values including the numbers of rows and columns N₁, N₂ of antenna elements that will be used to convey the multi-port PRS, the oversampling factor Q, the alphabet of $\phi$ values, and possibly which REs correspond to each polarization of signal emitted from the TRP 300. Also or alternatively, the TRP 300 may provide the codebook configuration values N₁, N₂, Q, $\phi$ in a codebook configuration message 1216 at stage 1214.

The TRP 300 is configured to transmit the multi-port PRS with multiple PRS ports within a single slot using multiple, e.g., adjacent, OFDM symbols. For example, the TRP 300 may send the multi-port PRS using a transmission pattern supported for CSI-RS, as shown in FIG. 7, for a corresponding number of ports, examples of which are shown in FIGS. 8-10. For example, the antenna 346 of the TRP 300 may be configured with 32 elements (ports) comprising 16 elements of one polarization and 16 elements of another polarization (e.g., cross-polarization relative to the other elements), with the elements of each polarization arranged in a 4×4 array. With an oversampling factor of one, i.e., Q=1, there will be 16 steering matrices. The TRP 300 may group the ports, code division multiplex each group, and send the CDM-ed groups to the UE 500. The TRP 300 may send multiple CDM-ed groups of each of the polarizations, with the CDM-ed ports for one polarization sent in different groups from the other polarization. The different groups of the same polarization may be in different PRBs and thus different sub-bands.

At stage 1218, the UE 500 receives and measures multi-port PRS 1219 sent by the TRP 300. The UE 500 is configured to measure a multi-port PRS signal having multiple ports (i.e., multiple positioning signals corresponding to multiple ports) in a single slot (and possibly in a single resource), although the UE 500 may measure the multi-port PRS resource multiple times (e.g., multiple repetitions of the multi-port PRS resource) to adequately measure the signal and obtain desired information. A multi-port PRS signal may thus comprise multiple signals, may be referred to as a multi-port PRS. The multi-port PRS may span a subset of a slot or, through repetition, multiple slots.

At stage 1220, the UE 500 analyzes and processes the measured beams to determine feedback information. The feedback information may be indicative of a beam that would have an earliest arrival time and thus a shortest travel time (corresponding to a shortest travel path) from the TRP 300 to the UE 500. The beam with the earliest arrival time from (and thus the shortest travel time to, equivalently the shortest travel path to) the UE 500 is most likely to be in an LOS relationship with the TRP 300. The UE 500 is configured to apply the steering matrices w individually to the measured multi-port PRS 1219. The UE 500 can remove the code division multiplexing from the CDM-ed groups to yield multi-port measurements corresponding to signals for the individual channels corresponding to the individual ports. The UE 500 can obtain the steering matrices w (e.g., by retrieving the matrices from the memory 530 or by calculating the matrices) and multiply (in the frequency domain, or convolve in the time domain) the steering matrices w with the measured channels.

Figure 13:
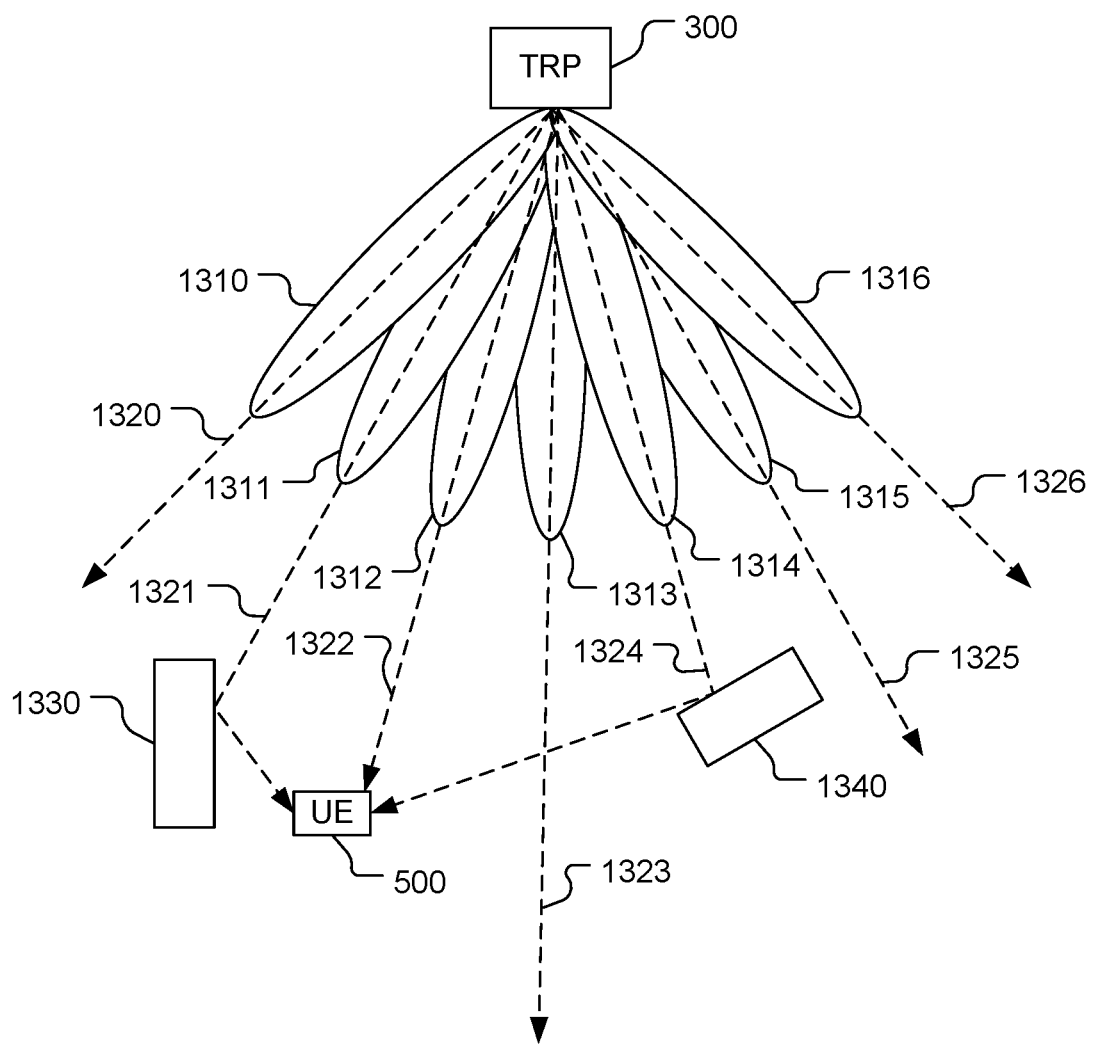
FIG. 13 is a simplified diagram of effective beams of a multi-port positioning reference signal sent by a transmission/reception point.

Referring also to FIG. 13, applying the steering matrices w to the measured channels will isolate energy from the multi-port PRS into effective beams, each effective beam corresponding to each individually-applied steering matrix. By applying a codebook of precoder matrices in accordance with the codebook configuration values ($N_1$, $N_2$, Q, φ), the UE 500 is able to analyze the multi-port PRS transmitted by the TRP 300 as though the TRP 300 sent the PRS in directional beams, e.g., effective beams 1310, 1311, 1312, 1313, 1314, 1315, 1316 directed along lines 1320, 1321, 1322, 1323, 1324, 1325, 1326, respectively, although application of the steering matrices w may result in more or fewer effective beams than shown. The effective beams are logical reconstructions based on the received energy in the multi-port PRS and not necessarily beams as transmitted by the TRP 300 (i.e., the TRP 300 may not beamform the multi-port PRS). For simplicity of the figure, the effective beams 1310-1316 shown are in directed in a single plane, but applying a two-dimensional codebook to the PRS will produce effective beams directed in three dimensions. In the example shown, the effective beams 1311, 1312, 1314 all reach the UE 500, with the effective beams 1311, 1314 being multipath signals reflecting off structures 1330, 1340, respectively. Consequently, path lengths of the effective beams 1311, 1314 are longer than a path length of the effective beam 1312, which is a line-of-sight beam from the TRP 300 to the UE 500. Thus, a time of travel of the effective beam 1312 from the TRP 300 to the UE 500 is shorter than the times of travel of the effective beams 1311, 1314 from the TRP 300 to the UE 500, and consequently a time of arrival of the effective beam 1312 is earlier than the beams 1311, 1314. As the beams 1310-1316 are logically simulated using the codebook, the times of travel may be considered effective times of travel (the times that the multi-port PRS would travel were the multi-port PRS physically sent in the beams 1310-1316). Some beams, here the effective beams 1310, 1313, 1315, 1316 do not reach the UE 500, or energy reaching the UE 500 from these beams is so low that the energy may not be detectable or at least can be ignored, and thus effectively not reaching the UE 500.

Figure 14:
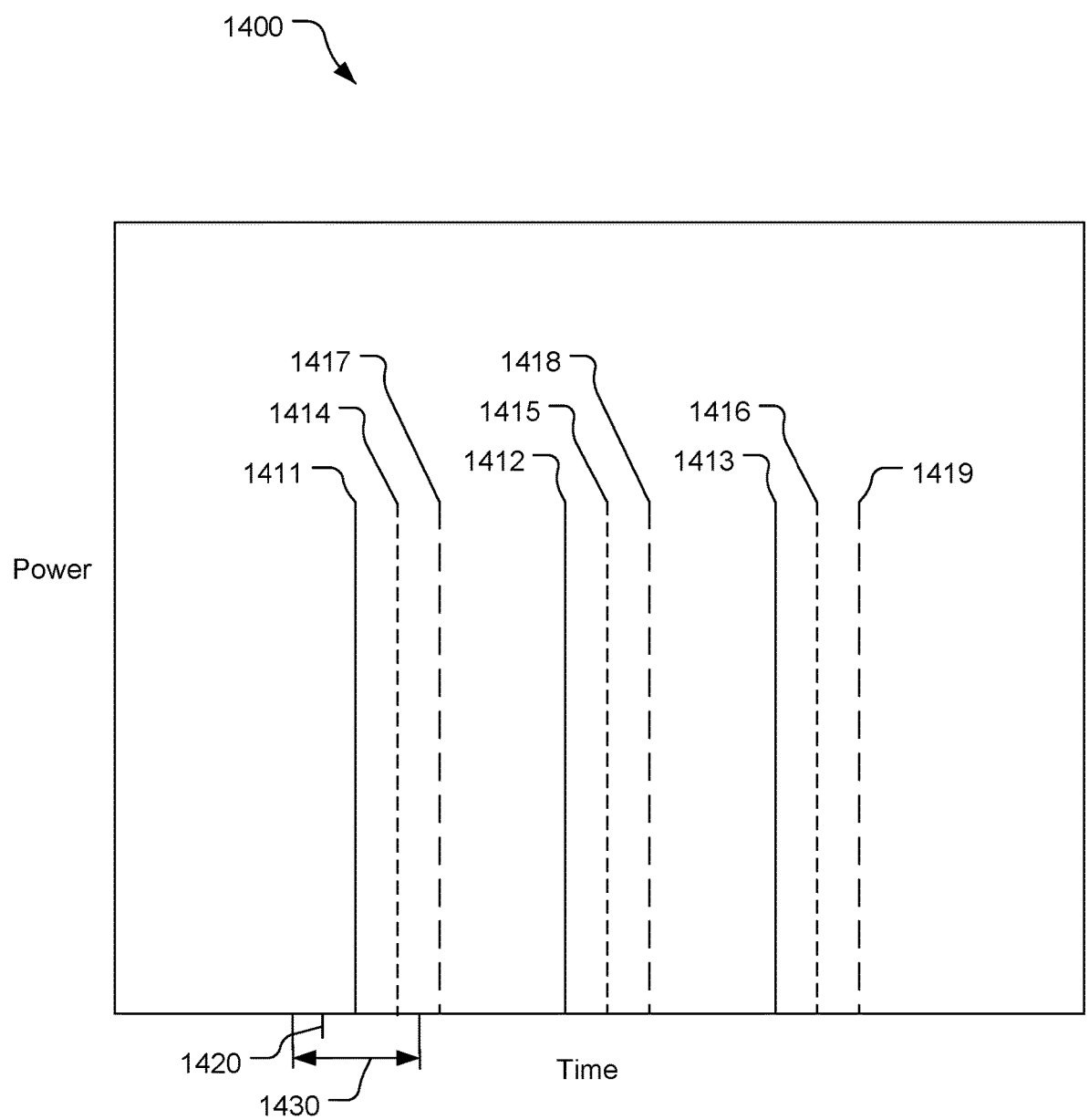
FIG. 14 is a graph of impulse responses corresponding to effective beams shown in FIG. 13.

Referring also to FIG. 14, applying the steering matrices w to the received PRS to isolate the energy of effective beams yields an impulse response for each effective beam. The UE 500 is configured to analyze the impulse responses of multiple effective beams of the multi-port PRS to determine which beam arrived first (earliest) and thus had the shortest time of travel from the TRP 300 to the UE 500. The impulse response of each of the effective beams may have multiple peaks in time due to aliasing from using partially-staggered (i.e., not fully-staggered) ports, especially with a low density of REs per port, e.g., a density of one for the examples shown in FIGS. 8-10. As shown in FIG. 14, an example graph 1400 of impulse responses for the effective beams 1311, 1312, 1314 includes three peaks for each effective beam, with peaks 1411, 1412, 1413 corresponding to the effective beam 1312, peaks 1414, 1415, 1416 corresponding to the effective beam 1311, and peaks 1417, 1418, 1419 corresponding to the effective beam 1314.

To help resolve which of multiple peaks in the impulse response for each effective beam the UE 500 should use to determine which effective beam arrived earliest, the UE 500 may be configured to obtain an expected time of arrival of the multi-port PRS. The expected time of arrival may be relative to a reference time that may be a recurring event, e.g., a beginning of a slot. The expected time of arrival may be provided to the UE 500 (e.g., by a network entity such as the TRP 300 and/or the server 400) and/or the UE 500 may calculate the expected time of arrival. For example, the UE 500 may be configured to receive and measure a single-port, fully-staggered PRS resource 1222 at stage 1224 and use an arrival time of this resource as the expected time of arrival of an earliest-arriving effective beam of the multi-port PRS. Examples of such single-port, fully-staggered PRS resources are shown in FIGS. 6A-6F. The UE 500 may receive the single-port, fully-staggered reference signal, called a source reference signal, earlier in time than the target reference signal, i.e., the multi-port PRS. For on-demand scenarios, the UE 500 may send a source/target RS request 1226 at stage 1228 requesting transmission of both the target reference signal and the source reference signal, in which case the source RS 1222 and the multi-port PRS 1219 (the target RS) would be received after stage 1228. For aperiodic/DCI-triggered PRS, a joint triggering of the source RS with the target RS may be implemented and the source RS and the target RS received and measured by the UE 500. The source RS and the target RS are quasi-co-located (QCLed) at least with respect to average delay to the UE 500, and are part of the same bandwidth, or frequency layer, or band, or component carrier. The UE 500 is configured to determine the arrival time of the source RS and use this as a reference point for the expected arrival time of the earliest effective beam of the multi-port PRS (to assume that the source RS and the target RS have a similar/the same ToA). As shown in FIG. 14, the UE 500 may use the arrival time 1420 of the source RS to establish a window 1430 (e.g., the arrival time 1420 of the source RS plus or minus a threshold time, or plus one threshold time and minus another threshold time). The UE 500 may ignore impulse response peaks outside of the window 1430 and find the earliest peak of the effective beams to determine the effective beam with the earliest arrival time (shortest travel time or shortest travel distance as these are equivalent) from the TRP 300 to the UE 500 and thus the most likely effective beam to be LOS between the TRP 300 and the UE 500. The UE 500 may determine the earliest arrival time of the effective peaks relative to a reference time such as the expected time of arrival 1420. The reference time may be a recurring event, such as a beginning of a slot. In the example shown in FIG. 14, the peaks 1412, 1413, 1415-1419 of the effective beams 1311, 1312, 1314 are outside the window 1430 and thus ignored by the UE 500. The peaks 1411, 1414 (of the beams 1312, 1311, respectively) are inside the window 1430, with the peak 1411 corresponding to the effective beam 1312 being earliest in time. The UE 500 will determine an effective beam, e.g., a beam index of a combination of k and l corresponding to the earliest-arriving effective beam, e.g., the effective beam 1312 in the example shown in FIGS. 13 and 14. Thus, the UE 500 chooses the effective beam 1312 from the codebook based on the measurements of the multi-port PRS resource, e.g., from analysis of logically-simulated beams using the codebook.

The UE 500 is configured to apply the steering matrices w to the received PRS for each polarization of PRS. The UE 500 may apply each of the possible values of φ for each of the steering matrices w to determine the earliest arriving effective beam for one of the polarizations (e.g., for the channels corresponding to the REs of one of the polarizations or for both of the polarizations). The UE 500 may determine the difference in φ for the effective beams determined to be the earliest arriving for the two polarizations. The beam indices for these effective beams should be the same, the travel times and arrival times of these effective beams should be similar if not the same, and the difference in φ is the value of φ of the earliest-arriving effective beam if the possible values of φ were applied to the steering matrices w for only one of the polarizations (or the difference in the two φ values if φ was determined for each beam). The determined value of the difference in φ is the co-phasing factor to be reported by the UE 500. The alphabet of φ values (e.g., a number of bits used to describe the co-phasing factor) may be configured by a network entity (e.g., the TRP 300 or the server 400) or may be reported by the UE 500 as part of the feedback discussed below.

The UE 500 may be configured to apply the steering matrices w to the received PRS sent in different sub-bands. The UE 500 may compare the determined values of φ or the co-phasing factor for the earliest-arriving effective beams based on the analysis of the different sub-band PRS and determine a quality metric indicative of whether the earliest-arriving effective beams are LOS between the TRP 300 and the UE 500. The quality metric may indicate the difference of the values of φ or the co-phasing factor determined using the PRS of the different sub-bands. The quality metric may have a relatively lower value if the difference of the values of φ or the co-phasing factor is more than a threshold value or where the identified earliest-arriving effective beam is better characterized by multiple co-phasing factors rather than one co-phasing factor, either case indicating a scenario where the earliest-arriving effective beam is unlikely to have LOS from the TRP 300 to the UE 500, e.g., no LOS effective beam has been identified by the UE 500.

The UE 500 may be configured to determine the angle of departure (AoD) of the effective beam determined to be the earliest arriving (e.g., the effective beam 1312). The steering matrix w corresponding to the earliest-arriving effective beam provides an AoD relative to the antenna 346 of the TRP 300. The UE 500 may use a location and orientation of the TRP 300 in combination with the steering matrix w corresponding to the earliest-arriving effective beam to determine an AoD relative to a global coordinate system.

The UE 500 may be configured to determine one or more other measurements. For example, the UE 500 may determine one or more timing measurements, e.g., ToA and/or UE Rx-Tx (a time difference between receipt of a signal at the UE 500 and transmission of a corresponding response) for the earliest-arriving effective beam, and/or RSTD for the earliest-arriving effective beam with respect to an earliest-arriving effective beam of one or more other TRPs 300 used as a reference. As other examples, the UE 500 may be configured to determine the RSRP of the earliest-arriving effective beam, and/or the RSRP of an overall channel, i.e., of a combination (e.g., an average) of all of the effective beams, and/or a ratio of the RSRP of the earliest-arriving effective beam to the RSRP of the overall channel.

At stage 1234, the UE may provide feedback determined during stage 1220 to a network entity. For example, the UE 500 may provide a feedback message 1230 using LPP (LTE Positioning Protocol) to the TRP 300, which may send the feedback to the server 400 using NRPPa (New Radio Position Protocol A). Also or alternatively, the UE 500 may provide the feedback in a feedback message 1232 to the server 400 using LPP. The feedback message 1230, 1232 may include the beam index (k, 1 tuple) and the co-phasing factor for the earliest-arriving effective beam and/or may include the AoD of the earliest-arriving effective beam. The feedback message 1230, 1232 may also include the ToA and/or UE Rx-Tx, RSTD, RSRP, and/or quality metric as discussed above, and/or the oversampling factor Q, and/or number of bits used to describe the co-phasing factor.

At stage 1236, the server 400 can use the feedback information to determine a position of the UE 500. For example, the server 400 can use, or determine, the AoD for an LOS beam to the UE 500 as part of a trilateration determination, e.g., using other AoDs for LOS beams from other TRPs 300, and the locations of the TRPs, to determine the location of the UE 500.

Operation

Figure 15:
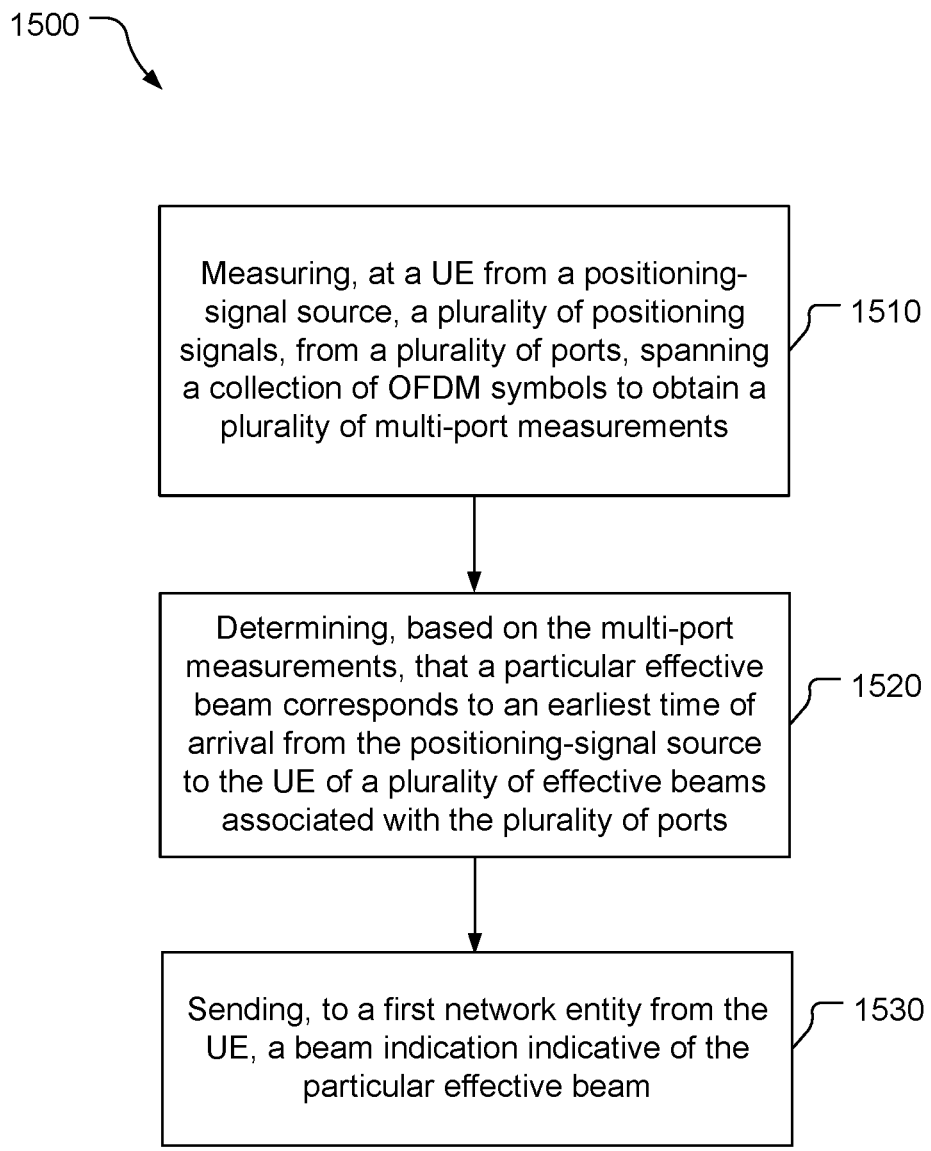
FIG. 15 is a block flow diagram of a method of providing multi-port-measurement feedback.

Referring to FIG. 15, with further reference to FIGS. 1-14, a method 1500 of providing multi-port-measurement feedback includes the stages shown. The method 1500 is, however, an example only and not limiting. The method 1500 may be altered, e.g., by having stages added, removed, rearranged, combined, performed concurrently, and/or having single stages split into multiple stages.

At stage 1510, the method 1500 may include measuring, at a UE from a positioning-signal source, a plurality of positioning signals, from a plurality of ports, spanning a collection of OFDM symbols to obtain a plurality of multi-port measurements. For example, in stage 1218 of the flow 1200 the TRP 300 sends the multi-port PRS 1219 to the UE 500 and the UE 500 receives and measures the multi-port PRS resource. The multi-port PRS resource may include the plurality of positioning signals in a single resource. The UE 500 may measure multiple repetitions of the multi-port PRS resource to obtain the multi-port measurements, e.g., of sufficient quality. The TRP 300 may send the multi-port PRS to the UE 500 in accordance, for example, with a CSI-RS RE pattern for CSI acquisition such as the patterns indicated in FIGS. 7-10. The UE 500 may remove CDM from multiplexed signals to reveal channel signals of the multi-port PRS resource, with the channel signals being multi-port measurements. The transceiver 520 (e.g., the wireless receiver 244), the antenna 246, and the processor 510 (and possibly the memory 530) may comprise means for receiving positioning signals from the positioning-signal source and means for measuring a multi-port PRS resource.

At stage 1520, the method 1500 may include determining, based on the multi-port measurements, that a particular effective beam corresponds to an earliest time of arrival from the positioning-signal source to the UE of a plurality of effective beams associated with the plurality of ports. For example, to determine that the particular effective beam corresponds to the earliest time of arrival of the plurality of effective beams, the method 1500 may include choosing the particular effective beam from a codebook of steering vectors based on the multi-port measurements, with the codebook resulting in the particular effective beam corresponding to the shortest travel time from among the plurality of effective beams and earliest time of arrival at the UE. The particular effective beam effectively has the shortest travel time and earliest time of arrival of the beams because applying the codebook provides predicted results as if the beams were actually sent. The steering vectors of the codebook may form steering matrices that include the steering vectors. Determining that the particular effective beam of the plurality of effective beams corresponds to an earliest arrival time may comprise determining an impulse response corresponding to each of the effective beams and determining the impulse response with an earliest time of arrival. For example, the processor 510 may analyze peaks of aliased impulse responses (e.g., as shown in FIG. 14) to determine an earliest-arriving peak and a corresponding effective beam. The processor 510 (and possibly the memory 530) may comprise means for determining that the particular effective beam has the earliest time of arrival from the positioning-signal source to the UE based on the multi-port measurements. The processor 510 (and possibly the memory 530) may comprise means for applying the steering vectors to the multi-port measurements.

At stage 1530, the method 1500 may include sending, to a first network entity from the UE, a beam indication indicative of the particular effective beam. For example, the beam indication may be an angle of departure of the particular effective beam from the positioning-signal source. As another example, the beam indication may comprise a beam index indicating a particular steering vector that corresponds to the particular effective beam. The network entity may be the server 400, or the TRP 300, or may include multiple entities such as the TRP 300 and the server 400. The transceiver 520 (e.g., the wireless transmitter 242), the antenna 246, and the processor 510 (and possibly the memory 530) may comprise means for sending the beam indication to the network entity.

The method 1500 may include one or more further features, including one or more of the following features. For example, the method 1500 may include receiving one or more codebook configuration values (e.g., numbers of rows and/or columns of antenna ports, possible phase values, an oversampling value) from a second network entity (which may or may not be the same entity as the first network entity), and calculating the steering vectors based on the one or more codebook configuration values. For example, the UE 500 may receive the codebook configuration value(s) from the server 400 in the PRS configuration 1212 and/or from the TRP 300 in the message 1216 via the transceiver 520 (e.g., via the wired receiver 254). The UE 500 may calculate the steering vectors (e.g., steering matrices) in accordance with one or more of equations (1)-(3) as appropriate. The transceiver 520 (e.g., the wireless receiver 244), the antenna 246, and the processor 510 (and possibly the memory 530) may comprise means for receiving at least one codebook configuration value (including means for receiving and means for calculating steering vectors based on the at least one codebook configuration value. This includes means for receiving antenna port dimension(s) $N_1$, $N_2$, means for receiving an oversampling factor Q, and/or means for receiving one or more indications of possible φ values and means for calculating the steering vectors based on appropriate one(s) of these configuration values.

Also or alternatively, the method 1500 may include one or more of the following features. For example, the method 1500 may include: determining a co-phasing factor for the particular effective beam and another effective beam, the particular effective beam and the other effective beam corresponding to different polarizations; and sending the co-phasing factor to a second network entity (which may or may not be the same entity as the first network entity). A single value of the co-phasing factor may be sent corresponding to an entire bandwidth of the plurality of positioning signals. The processor 510 (and possibly the memory 530) may comprise means for determining the co-phasing factor and the transceiver 520 (e.g., the wireless transmitter 242), the antenna 246, and the processor 510 (and possibly the memory 530) may comprise means for sending the co-phasing factor. As another example, the plurality of positioning signals comprises a multi-port PRS resource and the method 1500 includes obtaining an expected time of arrival of the multi-port PRS resource, and determining the earliest time of arrival based on the expected time of arrival of the multi-port PRS resource. For example, the UE may receive an indication of the expected time of arrival or may receive a single-port, fully-staggered PRS resource and use the single-port, fully-staggered PRS resource as a QCL reference for the multi-port PRS resource, e.g., with respect to average delay of the multi-port PRS resource, or the expected arrival time, or both. As discussed herein, the UE may use the expected arrival time to produce a time window in which a determined arrival time of an effective beam of the multi-port PRS resource must arrive to be considered for having an earliest time of arrival. The multi-port PRS may span a single slot (e.g., a subset of a single slot) or, through repetition, span multiple slots. The transceiver 520 (e.g., the wireless receiver 244), the antenna 246, and the processor 510 (and possibly the memory 530) may comprise means for obtaining the expected time of arrival, including means for measuring a single-port, fully-staggered PRS resource and using the single-port, fully-staggered PRS resource as a QCL reference for the multi-port PRS resource. The plurality of positioning signals may comprise a plurality of single-port PRS resources, and the method 1500 may include obtaining an expected time of arrival for each of the plurality of single-port PRS resources, and determining the earliest time of arrival based on the expected time of arrival of each of the plurality of single-port PRS resources.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
 a transceiver configured to receive positioning signals from a positioning-signal source;
 a memory; and
 a processor communicatively coupled to the transceiver and the memory, the processor configured to:
 measure a plurality of the positioning signals, from a plurality of ports, spanning a collection of Orthogonal Frequency Division Multiplexed symbols to obtain a plurality of multi-port measurements;

determine, based on the plurality of multi-port measurements, that a particular effective beam corresponds to an earliest time of arrival from the positioning-signal source to the UE of a plurality of effective beams associated with the plurality of ports,
wherein to determine that the particular effective beam corresponds to the earliest time of arrival of the plurality of effective beams, the processor is configured to choose the particular effective beam from a codebook based on the plurality of multi-port measurements, wherein the codebook comprises a plurality of steering vectors, and wherein the beam indication comprises a beam index indicative of a particular steering vector, of the plurality of steering vectors, that corresponds to the particular effective beam; and
send, via the transceiver to a first network entity, a beam indication indicative of the particular effective beam.

2. The UE of claim 1, wherein the processor is further configured to:
receive at least one codebook configuration value from a second network entity via the transceiver; and
calculate the plurality of steering vectors of the codebook based on the at least one codebook configuration value.

3. The UE of claim 2, wherein the processor is further configured to:
receive an oversampling factor from the second network entity; and
calculate the plurality of steering vectors based further on the oversampling factor.

4. The UE of claim 1, wherein the memory stores the plurality of steering vectors.

5. The UE of claim 1, wherein the beam indication is an angle of departure of the particular effective beam from the positioning-signal source.

6. The UE of claim 1, wherein the particular effective beam is a first effective beam, and wherein the processor is further configured to:
determine a co-phasing factor for the particular effective beam and a second effective beam, of the plurality of effective beams, the particular effective beam and the second effective beam corresponding to different polarizations; and
send, via the transceiver to a second network entity, the co-phasing factor.

7. The UE of claim 6, wherein the processor is configured to send the co-phasing factor such that a single value of the co-phasing factor corresponds to an entire bandwidth associated with the plurality of the positioning signals.

8. The UE of claim 6, wherein the processor is further configured to send, to the second network entity, a quality metric indicating whether the particular effective beam is a line-of-sight beam between the positioning-signal source and the UE.

9. The UE of claim 1, wherein the plurality of the positioning signals comprises a multi-port PRS resource (multi-port positioning reference signal resource), and wherein the processor is configured to:
obtain an expected time of arrival of the multi-port PRS resource; and
determine the earliest time of arrival based on the expected time of arrival of the multi-port PRS resource.

10. The UE of claim 9, wherein to obtain the expected time of arrival of the multi-port PRS resource, the processor is configured to:
measure a single-port, fully-staggered PRS resource to obtain a single-port measurement; and
use the single-port, fully-staggered PRS resource as a quasi co-located (QCL) reference for the multi-port PRS resource.

11. The UE of claim 10, wherein the processor is configured to use the single-port, fully-staggered PRS resource as the QCL reference with respect to at least one of average delay of the multi-port PRS resource or the expected time of arrival of the multi-port PRS resource.

12. The UE of claim 9, wherein to obtain the expected time of arrival of the multi-port PRS resource, the processor is configured to receive, via the transceiver, an explicit indication of time of arrival.

13. The UE of claim 1, wherein to determine that the particular effective beam of the plurality of effective beams corresponds to the earliest time of arrival from the positioning-signal source to the UE, the processor is configured to:
determine an impulse response corresponding to each of the plurality of effective beams; and
determine the impulse response with the earliest time of arrival.

14. The UE of claim 1, wherein the processor is configured to measure the plurality of the positioning signals in accordance with a channel state information reference signal resource element pattern for channel state information acquisition.

15. The UE of claim 1, wherein the plurality of the positioning signals are in a single resource.

16. The UE of claim 1, wherein the plurality of the positioning signals comprises a plurality of single-port PRS resources, and wherein the processor is configured to:
obtain an expected time of arrival for each of the plurality of single-port PRS resources; and
determine the earliest time of arrival based on the expected time of arrival of each of the plurality of single-port PRS resources.

17. A user equipment (UE) comprising:
receiving means for receiving positioning signals from a positioning-signal source;
measuring means for measuring a plurality of the positioning signals, from a plurality of ports, spanning a collection of Orthogonal Frequency Division Multiplexed symbols to obtain a plurality of multi-port measurements;
determining means for determining, based on the plurality of multi-port measurements, that a particular effective beam corresponds to an earliest time of arrival from the positioning-signal source to the UE of a plurality of effective beams associated with the plurality of ports,
wherein the determining means are for choosing the particular effective beam from a codebook based on the plurality of multi-port measurements to determine that the particular effective beam corresponds to the earliest time of arrival of the plurality of effective beams, wherein the codebook comprises a plurality of steering vectors, and wherein the sending means are for selecting a beam index, as the beam indication, indicative of a particular steering vector, of the plurality of steering vectors, that corresponds to the particular effective beam; and
sending means for sending, to a first network entity, a beam indication indicative of the particular effective beam.

18. The UE of claim 17, further comprising means for determining an angle of departure of the particular effective beam from the positioning-signal source as the beam indication.

19. The UE of claim 17, wherein the particular effective beam is a first effective beam, the UE further comprising phase means for determining a co-phasing factor for the particular effective beam and a second effective beam, of the plurality of effective beams, the particular effective beam and the second effective beam corresponding to different polarizations, wherein the sending means are further for sending, to a second network entity, the co-phasing factor.

20. The UE of claim 19, wherein the sending means are for sending the co-phasing factor such that a single value of the co-phasing factor corresponds to an entire bandwidth associated with the plurality of the positioning signals.

21. The UE of claim 19, further comprising quality means for determining a quality metric indicative of whether the particular effective beam is a line-of-sight beam between the positioning-signal source and the UE, wherein the sending means are further for sending the quality metric to the second network entity.

22. The UE of claim 17, wherein the plurality of the positioning signals comprises a multi-port PRS resource (multi-port positioning reference signal resource), the UE further comprising means for obtaining an expected time of arrival of the multi-port PRS resource, wherein the determining means are for determining the earliest time of arrival based on the expected time of arrival of the multi-port PRS resource.

23. The UE of claim 22, wherein the means for obtaining the expected time of arrival of the multi-port PRS resource comprise:
 means for measuring a single-port, fully-staggered PRS resource to obtain a single-port measurement; and
 using means for using the single-port, fully-staggered PRS resource as a quasi co-located (QCL) reference for the multi-port PRS resource.

24. The UE of claim 23, wherein the using means are for using the single-port, fully-staggered PRS resource as the QCL reference with respect to at least one of average delay of the multi-port PRS resource or the expected time of arrival of the multi-port PRS resource.

25. The UE of claim 17, wherein the determining means are for:
 determining an impulse response corresponding to each of the plurality of effective beams; and
 determining the impulse response with the earliest time of arrival.

26. A method of providing multi-port-measurement feedback, the method comprising:
 measuring, at a user equipment (UE) from a positioning-signal source, a plurality of positioning signals, from a plurality of ports, spanning a collection of Orthogonal Frequency Division Multiplexed symbols to obtain a plurality of multi-port measurements;
 determining, based on the plurality of multi-port measurements, that a particular effective beam corresponds to an earliest time of arrival from the positioning-signal source to the UE of a plurality of effective beams associated with the plurality of ports,
 wherein determining that the particular effective beam corresponds to the earliest time of arrival of the plurality of effective beams comprises choosing the particular effective beam from a codebook based on the plurality of multi-port measurements, wherein the codebook comprises a plurality of steering vectors, and wherein the beam indication comprises a beam index indicative of a particular steering vector, of the plurality of steering vectors, that corresponds to the particular effective beam; and
 sending, to a first network entity from the UE, a beam indication indicative of the particular effective beam.

27. The method of claim 26, further comprising:
 receiving, at the UE, at least one codebook configuration value from a second network entity; and
 calculating, at the UE, the plurality of steering vectors of the codebook based on the at least one codebook configuration value.

28. A non-transitory, processor-readable storage medium comprising processor-readable instructions to cause a processor of a user equipment (UE) to:
 measure, from a positioning-signal source, a plurality of positioning signals, from a plurality of ports, spanning a collection of Orthogonal Frequency Division Multiplexed symbols to obtain a plurality of multi-port measurements;
 determine, based on the plurality of multi-port measurements, that a particular effective beam corresponds to an earliest time of arrival from the positioning-signal source to the UE of a plurality of effective beams associated with the plurality of ports,
 wherein to determine that the particular effective beam corresponds to the earliest time of arrival of the plurality of effective beams, the processor is configured to choose the particular effective beam from a codebook based on the plurality of multi-port measurements, wherein the codebook comprises a plurality of steering vectors, and wherein the beam indication comprises a beam index indicative of a particular steering vector, of the plurality of steering vectors, that corresponds to the particular effective beam; and
 send, to a first network entity from the UE, a beam indication indicative of the particular effective beam.

* * * * *